United States Patent [19]

VanDenberg et al.

[11] Patent Number: 4,573,704
[45] Date of Patent: Mar. 4, 1986

[54] INTERNAL LIFT AXLE SUSPENSION SYSTEM

[75] Inventors: Ervin K. VanDenberg, Massillon; Jim Eckelberry, Canton, both of Ohio

[73] Assignee: Turner Quick-Lift Corporation, Canton, Ohio

[21] Appl. No.: 340,940

[22] Filed: Jan. 20, 1982

[51] Int. Cl.⁴ ............................................. B60G 11/26
[52] U.S. Cl. ................................. 280/704; 267/64.19
[58] Field of Search ................. 280/704, 43.23, 43.13; 267/64.21, 64.19, 156; 105/215 C

[56] References Cited

U.S. PATENT DOCUMENTS

| | | | |
|---|---|---|---|
| 2,917,318 | 12/1959 | Nallinger | 267/64.19 |
| 3,033,554 | 5/1962 | Francis | 267/64.21 |
| 3,338,184 | 8/1967 | Fisher | 105/215 C |
| 3,381,915 | 5/1968 | Nelson | 267/156 |
| 3,666,220 | 5/1972 | Rider | 267/156 |
| 3,771,812 | 11/1973 | Pierce et al. | 280/704 |
| 4,157,188 | 6/1979 | Sims | 280/704 |

*Primary Examiner*—John J. Love
*Assistant Examiner*—Ross Weaver
*Attorney, Agent, or Firm*—Geoffrey R. Myers

[57] ABSTRACT

Provided is a lift axle suspension system employing an extendible air chamber in which the lifting mechanism is located. The mechanism for lifting the vehicle's wheels out of road engagement includes a spirally coiled spring connected to a reel having a cable wrapped around it. The unwrapped end of the cable is connected to the vehicle and the reel is connected to the suspension. When air is supplied to the air chamber it extends, lowering the wheels into road engagement. In doing so, the chamber acts against the normal bias of the spirally coiled spring, playing out the cable as the reel rotates. Release of air from the chamber causes the bias of the spring to automatically rotate the reel in the opposite direction which in turn takes up the cable and raises the wheels from the road surface. Preloading of the spring serves to hold the suspension firmly in its riding position. The predetermined length of cable to be played out serves as a stop or shock absorber against over-extension of the air chamber.

14 Claims, 3 Drawing Figures

INTERNAL LIFT AXLE SUSPENSION SYSTEM

This invention relates to axle suspension systems for wheeled vehicles. More particularly, this invention relates to lift axle suspension systems for selectively lowering and raising the wheels of a vehicle into and out of engagement with the road surface.

With the advent following World War II of large load-carrying capacity trucks and trailers in this country, came the need to provide add-on axles, thereby to increase the capacity of a given truck over that of the chassis-cab as manufactured on the assemblyline with its limited number of axles. While add-on axles effectively increased carrying capacity, it was soon realized that as the number of wheel-bearing axles increased on a truck (i.e., straight truck or trailer) various difficulties arose, including tire scuffing, loss of fuel economy, inability to safely corner, etc. In order to mitigate these problems and still have increased carrying capacity the concept of a "lift axle suspension system" was developed. Such a suspension system could be selectively raised from the road surface or lowered into engagement with the road surface when needed. Thus mitigating the problems as aforementioned.

While many lift axle suspensions were designed and introduced into commerce, few were able to achieve recognition or commercial success through efficiency, durability, and economy. One that did, and one of the major historical developments in the lift axle suspension industry, is found in U.S. Pat. No. 3,285,621 issued to Mr. Stephen Turner, Jr., inventor, on Nov. 15, 1966. The lift axle suspension disclosed therein achieved both recognition and commercial acceptance through its simplicity, economy, durability, and efficiency. By using an inverted, normally upwardly biased leaf spring as the lifting mechanism in the suspension, Mr. Turner achieved synergistic effects in that several parts thought at the time to be critical to a stable and efficient suspension system, were eliminated and replaced with a single element, namely, the upwardly biased leaf spring. This simplicity of design allowed the suspension to be used in areas on a truck not available to the then known, and acceptable lift axle suspension systems. This was particularly true of the "pusher" (i.e., forward of the drive axle) position which at the time could not be used without significant difficulty in mounting by the then available and recognized lift axle suspensions. The Turner suspension allowed for easy installation on a vehicle, particularly in this pusher position, which could be so advantageously used particularly on straight trucks (e.g., of the construction dump truck type) and especially where space was at a premium, such as in a tandem straight truck environment, where the lift axle was to be used as the third rear axle in the pusher position on the vehicle.

Despite the fact that the Turner invention has now been in existence for almost two decades, it still remains as a major, competitive, and efficient concept in the lift axle suspension art. However, in recent years, the need to maximize the load carrying capacity of a given vehicle in order to operate the vehicle more profitably, has become of significant concern. This, coupled with the nature of certain bridge formulas found in existing highway weight limit laws, have given rise to a need for a suspension system which can, even more than the Turner invention, maximize the spacing between the lift axle and the other axles on the vehicle. There has also arisen a need with various chassis designs to be able to employ a suspension system somewhat more compact than the Turner suspension, in order to be able to fit it into the shorter longitudinal space found in the pusher position of some of these chassis.

For these reasons, it is apparent that there exists a need in the lift axle suspension art for a suspension which can achieve the various outstanding features of the Turner invention, particularly in regards to simplicity, efficiency, durability, and economy, while at the same time being of a more compact dimension. It is a purpose of this invention to fulfill this and other needs in the art which will become more apparent to the skilled artisan once given the following disclosure:

Generally speaking, this invention fulfills the above-described needs in the art by utilizing for the first time, the heretofore unused and otherwise wasted space within the air chamber for the location of the lifting mechanism in a lift axle suspension system. A unique lifting mechanism enables this to be accomplished. Thus, this invention fulfills the above-described needs in the art, by providing a lift axle suspension system for a frame member wheeled vehicle comprising an extendible air chamber, means for stabilizing said air chamber, a lift mechanism for raising the system out of road engagement, and means for extending said air chamber, thereby to lower said system into road engagement, the improvement comprising as said lift mechanism, a mechanism located within the internal confines of said air chamber.

In certain preferred embodiments of this invention, the air chamber comprises an upper and a lower plate member and a flexible sleeve located between these plate members, one of said plate members including a circumferential wall extending inwardly into the chamber and surrounding the lift mechanism. In certain further preferred embodiments, there is provided a unique lift mechanism which comprises a spring for normally biasing the system toward its raised position and means interconnecting the extendible air chamber with said spring means in such a manner that when the air chamber is extended by the application of pneumatic pressure, thereby lowering the system, the spring means is forced into a position against its normal bias, so that upon removal of the pneumatic pressure that system is automatically returned by the bias of the spring to its raised position. In still further preferred embodiments, the means for interconnecting the air chamber with the spring comprises a cable connected at one end of the frame of the vehicle and at the other end to a reel connected to the suspension system for taking up and letting out the cable, in accordance with the movement of the air chamber. In such a system, the spring is connected to the reel in such a way as to be normally biased to retain the reel in its take-up position, so that upon extension of the air chamber upon the application of pneumatic pressure therein, the reel is caused to let out the cable against the normal bias of the spring, thereby lowering the suspension, and so that upon release of the pneumatic pressure the reel is caused by the bias of the spring to take up the cable, thereby lifting the suspension.

In still further preferred embodiments, the spring comprises at least one, and preferably a pair of, spirally coiled metal springs normally biased to the coiled position. Such springs are conveniently located at either end of the cylindrical reel, such that one end is connected to the reel, while the other end is connected to the suspension. In this way, when the reel is let out, the spirally coiled metal spring tends to be rotated against its normal bias. By providing a stop mechanism for reeling out the cable, there is provided a limit stop which serves as, and in place of, a shock absorber in the suspension.

This invention will now be described with respect to certain embodiments thereof, as illustrated in the accompanying drawings, wherein:

IN THE DRAWINGS

FIG. 1 is a side plan, partially sectionalized view of an embodiment of a lift axle suspension system connected to the frame member of a vehicle in accordance with this invention;

FIG. 2 is a side plan, partially sectionalized view of an embodiment of the lift mechanism located in the air chamber, as illustrated in FIG. 1; and FIG. 3 is an end, partially sectionalized view of the embodiment in FIG. 2.

DESCRIPTION OF THE DRAWINGS

With reference now to the Figures, there is illustrated a lift axle suspension system 1 connected to longitudinal frame member 3 of a wheeled vehicle (e.g., truck or trailer) in any given position on that vehicle. Such a position may be either forward or rearward of the drive axle (i.e., either in the "pusher" or "tag" position, respectively). It is, of course, understood that FIG. 1 shows only one side of the vehicle, and the suspension is duplicated symmetrically on the other side of the vehicle, the two sides of the suspension being connected by axle 5, having at each end thereof wheels 7, along which the vehicle will travel when engaging the road surface 9 when the suspension is in its lowered, or road engaging position (as shown in the dotted lines in FIG. 1). Suspension 1 is unitized by longitudinal member 11 which is the member that connects suspension 1 to the longitudinal frame member 3 of the vehicle. While the suspension may be located in either direction.

Figure 1:
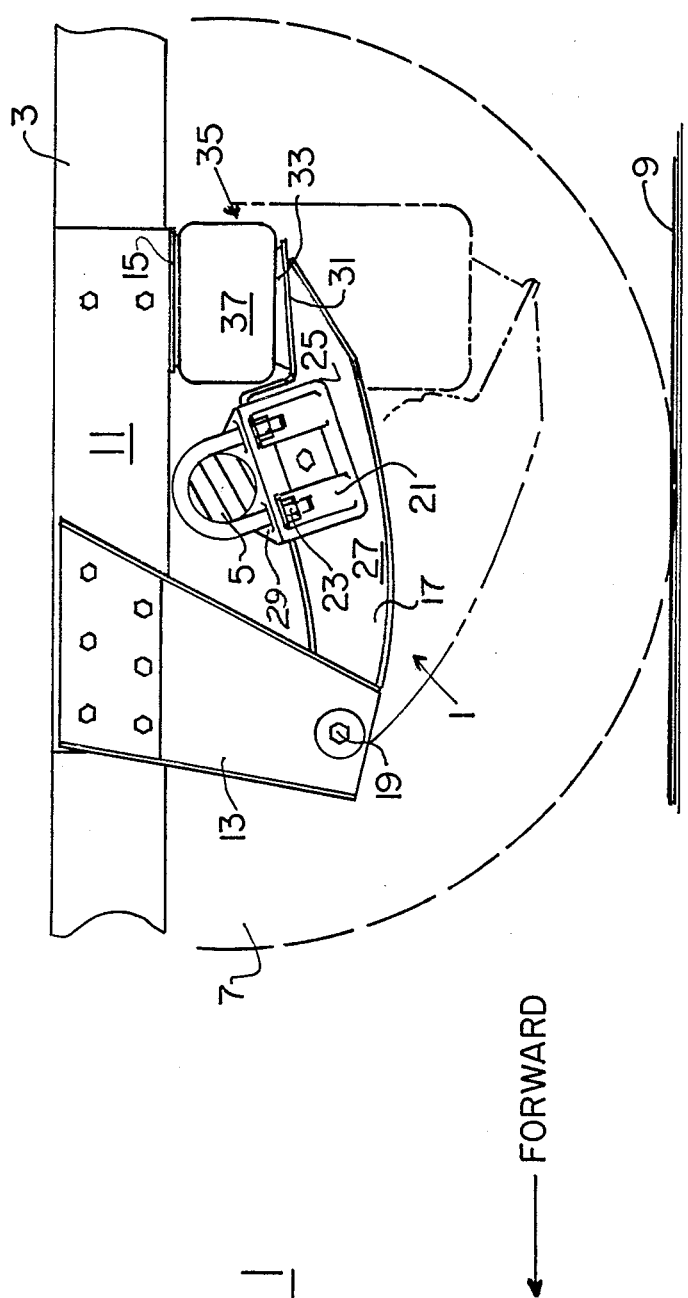
FIG. 1 shows the preferred direction in which at the forwardmost end of unitizing member 11 there is located hanger bracket 13, and at the rearward end upper plate member 15. At the lower end of hanger bracket 13 conventional, resiliantly bushed, connection 19 pivotally attaches beam 17 at its end to changer bracket 13. Resiliantly bushed pivotal connection 19 may be of the type as disclosed in U.S. Pat. No. 4,166,640.

Intermediate the ends of beam 17, there is located axle connecting member 21 which may be of known, conventional design or preferably of the type disclosed in our co-pending U.S. application Ser. No. 393,579, entitled "Vehicle Suspension Beam-to-Axle Connection", filed June 30, 1982. Such a connection, whether of the conventional type, or the unique type described in our aforementioned co-pending application, may conveniently include a pair of torqued u-bolts and nuts 23 (one located on each side of axle connection 21), a pair of plates 25 connected to side webs 27 of beam 17, and upper saddle-shaped axle seat members 29.

Located at the rearwardmost end of and as part of beam 17 is a shaped platform surface 31 on which is located lower pedestal plate 33 of air chamber assembly 35. Upper plate 15 and lower pedestal plate 33 combine with intermediate connecting resilient rubber sleeve 37 to thereby form a conventional air chamber assembly 35 of known type and construction such as produced by Firestone Tire & Rubber Company, or Goodyear Tire & Rubber Company.

Figure 2:
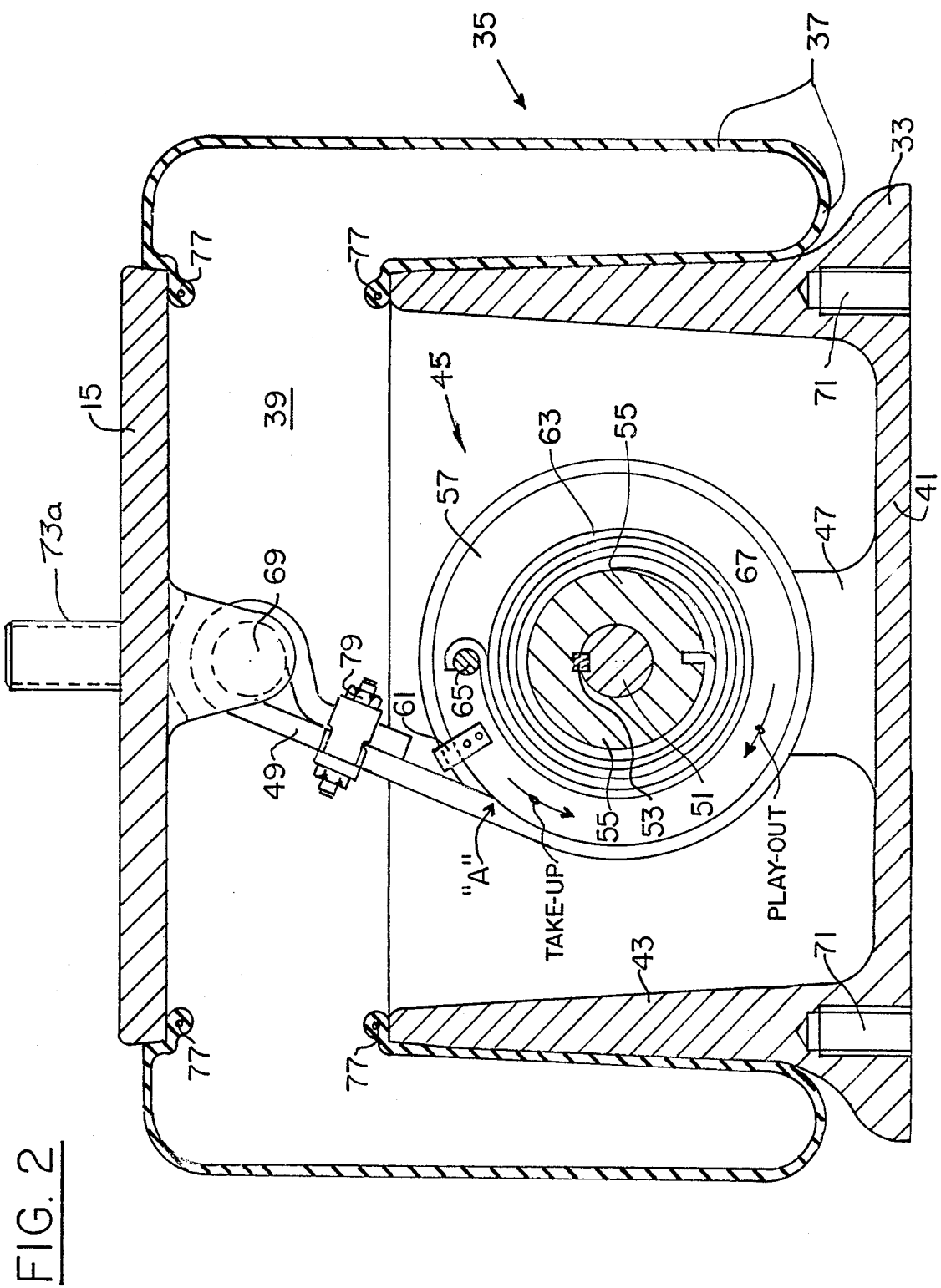
Figure 3:
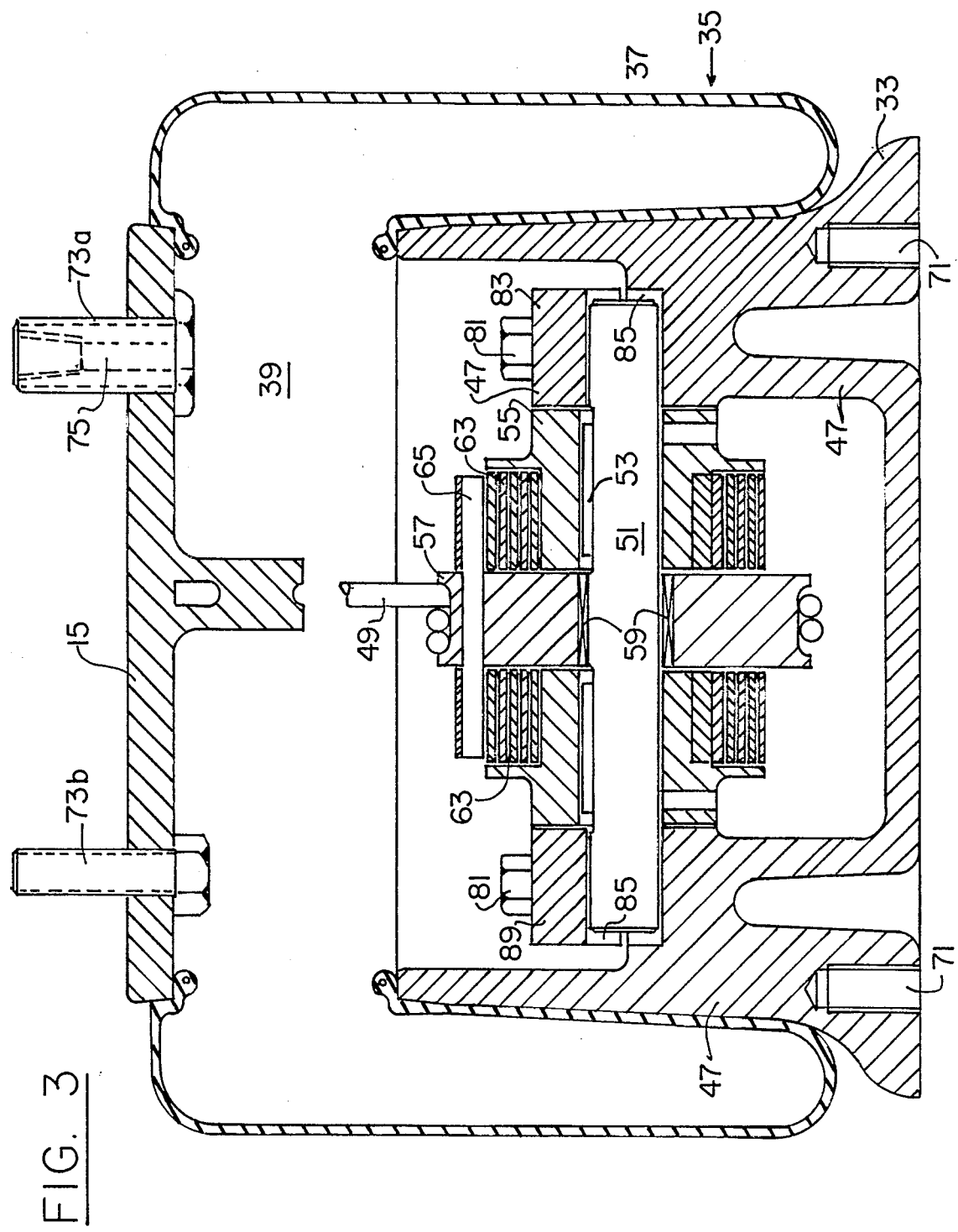

With reference now to FIGS. 2 and 3, it can be seen how a particular embodiment of the unique lift mechanism of the subject invention is located within the otherwise wasted space 39 within air chamber assembly 35. In this respect, lower pedestal 33 comprises a lower horizontal plate member 41, and an integral circumferential upstanding wall 43, which by its conventional construction, forms a natural protective chamber for at least a portion of lift mechanism 45.

Lift mechanism 45 comprises a support 47 connected to lower plate 41 which may itself be an integral part of pedestal 33 (as shown in FIG. 3) or a separate replaceable part, such that lift mechanism 45 may be easily removed from the system and replaced merely by removing support 47 and detachment of cable 49.

Connected to support 47 is a reel mechanism comprising a stationary shaft 51 connected by button means 53 to spring retaining means 55, which in turn, is rigidly connected to support 47. Reel 57 is rotatably mounted on shaft 51 by needle bearings 59.

Reel 57 has wrapped upon its outer circumferential surface cable 49. The circumference of reel 57 and the available extendible length of cable 49 are designed so as to give the desired degree of lift to the suspension system. In this respect, reel 57 is designed so as to play out a sufficient amount of cable 49 after less than one full rotation (e.g., approximately 350°-200°) of reel 57. This may be accomplished by any convenient mechanism, such as stop means 61, as illustrated in FIG. 2. Stop means 61, in this respect, may simply be a conventional clamp which runs axially across the face of the circumferential surface of reel 57, and tightly clamps cable 49 against the outer surface of reel 57. By such a simple clamp 61, cable 49, when reaching the point of rotation at which 49 would normally tangentially begin to separate (e.g., point "A") cable 49 is prohibited from doing so, and thus, acts as a stop or lower limit, and thus, as a type of shock absorber and safety device, for the suspension system. Cable 49, in this respect, is conveniently attached, as illustrated, to upper plate member 15, which, in turn, is, of course, connected to unitizing member 11, and thus, into frame member 3 of the vehicle.

In order to provide the lifting mechanism of suspension 1, there is provided at either end of reel 57 spiral coil spring 63. One end of each of the pair of spiral coil springs 63 is connected to pin 65 extending through reel 57. The other end 67 of spiral coil spring 63 is connected to (e.g. into) rigidly attached retaining member 55. The spiral of coil spring 63 is in the direction of take-up by reel 57 of cable 49, as shown by the arrows in FIG. 2. Thus, the normal coiled bias of spring 63 is in the coiled take-up direction, while the play-out rotational direction of reel 57 is against the normal bias of spiral coil spring 63.

Lift mechanism 45 may be located so as to be postured in any desired direction. However, for the purposes of this invention, it is somewhat preferred to posture mechanism 45 such that shaft 51 is substantially parallel to axle 5 and point "A" is rearward of shaft 51. It is also to be noted in this respect, that in the lifted position (as illustrated in FIGS. 2-3) the axial centers of cable connection 69, pin 65, button 53, shaft 51, and support 47 are in general vertical alignment.

Lower plate member 41 is connectable to platform 31 via conventional bolt or screw means 71. In like manner, upper plate member 15 may be connected to unitizing member 11 by conventional bolt means 73A, B, wherein bolt member 73A conveniently has oriface 75 located therein for application or release of air pressure into space 39.

The system illustrated in FIGS. 1-3 operates in the following manner. With the system initially biased and held in its uppermost or raised position (shown in solid lines in FIG. 1) wheels 7 are normally lifted off of the road surface and held firmly but resiliantly in their riding position, a distance relative to the amount of cable extending between cable connection 69 and point "A". In this riding mode, any tendency of the wheel to oscillate during travel of the vehicle, is held to a minimum by the dumping effect of the normal biased spiral coil springs 63.

In order to lower wheels 7 into load-bearing, road-engaging position, (as shown in dotted lines in FIG. 1) air pressure is applied through orifice 75, thereby expanding resilient sleeve 37, which in turn, forces plate 15 up against frame member 3 of the vehicle and forces lower pedestal 33 downwardly. Downward movement of pedestal 33 (and in turn, axle 5) takes place in a pivotal fashion about resiliantly bushed pivot connection 19 until wheels 7 contact road surface 9 and assume their desired share of the load of the vehicle as may be predetermined by selection of the appropriate air pressure by a conventional valve means located in the cab of the vehicle (not shown for convenience).

In order to go from its raised to lowered or road-engaging position, the air pressure applied to space 39 had to be sufficient to overcome the normal bias of spiral coil spring 63, thereby to allow reel 57 to rotate in the "play-out" or clockwise direction, a sufficient amount to allow cable 49 to elongate off of reel 57 until stop mechanism 61 prevents further play-out of cable 49. As long as the air pressure is maintained at a sufficient level to overcome the bias of spring 63 in now elongated chamber 39 (the dotted line in FIG. 1), the suspension system illustrated is one of a conventional, well-accepted, economic and durable type of suspension system which has been in existence for many years in the trucking industry. In such a suspension system, there is provided a partial "air-ride" type of suspension stabilized by beam 17 according to conventional and recognized engineering principals. The system is also compact in that the overall length of the system is that of the extremities of air chamber assembly 35 and hanger 13, without the need to take into account the addition of any add-on lifting mechanism, or the length of a longitudinally extending leaf spring (as in the Turner suspension).

When necessary or desirable, wheels 7 may be automatically lifted out of road engagement merely by releasing the air pressure holding the suspension in road engagement via the same controls in the cab. This is due to the normal bias of spirally coiled springs 63. Thus upon venting of air through orifice 75, coil springs 63 are caused by their bias and connection via pin 65 to automatically rotate reel 57 in its "take-up" or counterclockwise direction. This, in turn, causes cable 49 to be taken up or reeled in on reel 57 until the preloaded bias of coil spring 63 is just sufficient (or in other words is equal to) the weight of the suspension system acting as a beam from pivot 19, thereby to define once again, the raised or riding position, as shown in FIGS. 2-3 (and in solid lines in FIG. 1).

Given this disclosure, it is apparent to the skilled artisan that a highly unique and advantageous lift axle suspension system is provided for use by the trucking industry as a suspension ubiquitous to its placement on a wheeled vehicle (e.g., straight truck or trailer). In this respect, it is immediately noticeable that by locating the lift mechanism within the otherwise wasted space 39 of conventional air chambers 35, not only is contamination of the lift mechanism prevented, but the system is made more compact. This, in turn, results in its being able to be used in smaller spaces, in obtaining better spacing under the bridge formulas, and in the potential for being used longer in harsh environments. By providing the cable and its stop limit 61, there is provided a simple and effective means for preventing overextension of the air bags which could otherwise damage resilient sleeve 37. This in turn can serve in many instances to eliminate the need for a shock absorber or other protective external means that might otherwise interfere or give rise to a complexity in the mounting of the suspension on a particular chassis.

In addition to the above advantages, the subject invention achieves efficiency in that it allows for full axle travel, thus achieving the desired lifting height normally required by the industry. It also provides the benefit of easy replaceability, since all that need be done is to remove resilient sleeve 37 via its conventional ring structure 77, disconnect cable 49 at its conventional clamping bolt 79, separate rigid support member 47 by loosening bolts 81, and remove upper support clamp 83, thereby to allow easy removal of the reel mechanism, including shaft 51. Replacement then, of the lifting mechanism, takes place in the reverse order, merely by taking a new lift mechanism 45, placing it back in slot 85, rebolting upper clamp 83 and cable 49 via its bolt 79. In this respect, of course, the length of cable 49 would be adjusted so as to provide the tight riding mode desired, given the bias in coil spring 63. This can be easily accomplished merely by pulling cable 49 to some desired tension before replacing sleeve 37.

Once given the above disclosure, many other features, modifications and improvements become apparent to the skilled artisan. Such other features, modifications and improvements are considered a part of this invention, the scope of which is to be determined by the following claims:

We claim:

1. In a lift axle suspension system for a frame-membered wheeled vehicle comprising an extendible air chamber, means for stabilizing said air chamber, a lift mechanism for raising the system out of road engagement and means for extending said air chamber thereby to lower said system into road engagement, the improvement comprising as said lift mechanism, a mechanism located completely within the internal confines of said air chamber, said mechanism being of a size sufficient to raise the system to the desired height above the road and to effectively lower the system into full engagement with the road, wherein said air chamber comprises an upper and a lower plate member and a flexible sleeve located within said plate members; and wherein one of said plate members includes a circumferential wall extending inwardly into said chamber and which substantially surrounds said lift mechanism.

2. The improvement according to claim 1 wherein said lift mechanism comprises spring means for normally biasing the system toward its raised position and means interconnecting said extendible air chamber with said spring means in such a manner that when said air chamber is extended by the application of pneumatic pressure thereto, thereby lowering said system, said spring means is forced into a position against its normal bias so that upon removal of said pnuematic pressure said system is automatically returned by the bias of said spring to its raised position.

3. In a lift axle suspension system for a frame-membered wheeled vehicle comprising an extendible air chamber, means for stabilizing said air chamber, a lift mechanism for raising the system out of road engagement and means for extending said air chamber thereby to lower said system into road engagement, the improvement comprising as said lift mechanism, a mechanism located completely within the internal confines of said air chamber, said mechanism being of a size sufficient to raise the system to the desired height above the road and to effectively lower the system into full engagement with the road, wherein said lift mechanism comprises spring means for normally biasing the system toward its raised position and means interconnecting said extendible air chamber with said spring means in such a manner that when said air chamber is extended by the application of pneumatic pressure thereto, thereby lowering said system, said spring means is forced into a position against its normal bias so that upon removal of said pneumatic pressure said system is automatically returned by the bias of said spring to its raised position; and wherein said means interconnecting said air chamber with said spring comprises a cable connected at one end to the frame of said vehicle and at the other end to a reel means connected to said suspension system for taking up and letting out said cable in accordance with the movement of said air chamber, and wherein said spring means is connected to said reel in such a manner as to be normally biased so that upon the application of pneumatic pressure therein said reel is caused to let out said cable against the normal bias of said spring means thereby lowering said suspension so that upon release of said pneumatic pressure the reel is caused by the bias of the spring means to take up the cable, thereby lifting said suspension.

4. The improvement according to claim 3 wherein said spring means comprises a spirally coiled metal spring normally biased to a spirally coiled position.

5. The improvement according to claim 4 wherein said spring means comprises a pair of spirally coiled springs, wherein said reel is substantially cylindrical and said cable is wrapped around the circumference of said cylinder, and wherein one of said spirally coiled springs is located at each end of said cylinder.

6. The improvement according to claim 5 wherein said reel is rotatable about its longitudinal axis and is connected to the suspension system, one end of each of said spirally coiled springs is connected to said reel at a point radially spaced from the longitudinal axis of said reel and the other end of each of said spirally coiled springs is connected to said suspension such that when said reel rotates in a direction which lets out said cable, said spirally coiled spring is caused to uncoil from its normally coiled position thereby exerting a force on said reel in the direction of rotation which takes up said cable on said reel.

7. The improvement according to claim 6 wherein said suspension system further comprises a beam, a wheel bearing axle, means for connecting said axle to said beam, and means for connecting said air chamber to said beam, and said lift mechanism further includes a stop means associated with said reel effective to limit the amount of uncoiling of said spring, thereby to prevent overexpansion of said air chamber.

8. The improvement according to claim 7 wherein said suspension system further comprises an axle, wheels at either end of said axle, a pair of beams connected to said axle at a point intermediate the ends of said beam, one beam located adjacent and inboard of each of said wheels, a pair of said air chambers, one of said air chambers being connected to each of said beams by a bottom plate member and hanger means for pivotally connecting an end of each of said beams to a frame member of the vehicle.

9. The improvement according to claim 8 wherein said suspension system further comprises a pair of longitudinal support members for connecting said suspension to a respective frame member of the vehicle, and wherein each of said air chambers is connected by a top plate member to said longitudinal support member and said hanger means is attached to said longitudinal support member thereby to provide a unitized lift axle suspension system for mounting to the frame members of the vehicle.

10. The improvement according to claim 9 wherein said suspension system further includes means for selectively applying air to and releasing air from said air chambers.

11. In a frame-membered vehicle having first and second axles extending transversely of said vehicle and spaced from each other longitudinally thereof and each mounting wheels on opposite sides of said vehicle along which the vehicle may travel, a first suspension means connecting the first axle to the frame-members of said vehicle and a second suspension means for connecting the second axle to the frame members of said vehicle in such a manner that said wheels on said second axle may be selectively raised out of road engagement or lowered into road engagement, the improvement comprising as said suspension means the lift axle suspension system of claims 1 or 3.

12. In a frame-membered vehicle having first and second axles extending transversely of said vehicle and spaced from each other longitudinally thereof and each mounting wheels on opposite sides of said vehicle along which the vehicle may travel, a first suspension means connecting the first axle to the frame-members of said vehicle and a second suspension means for connecting the second axle to the frame members of said vehicle in such a manner that said wheels on said second axle may be selectively raised out of road engagement or lowered into road engagement, the improvement comprising as said second suspension means the lift axle suspension system of claim 3.

13. In a frame-membered vehicle having first and second axles extending transversely of said vehicle and spaced from each other longitudinally thereof and each mounting wheels on opposite sides of said vehicle along which the vehicle may travel, a first suspension means connecting the first axle to the frame-members of said vehicle and a second suspension means for connecting the second axle to the frame members of said vehicle in such a manner that said wheels on said second axle may be selectively raised out of road engagement or lowered into road engagement, the improvement comprising as said second suspension means the lift axle suspension system of claim 5.

14. In a frame-membered vehicle having first and second axles extending transversely of said vehicle and spaced from each other longitudinally thereof and each mounting wheels on opposite sides of said vehicle along which the vehicle may travel, a first suspension means connecting the first axle to the frame-members of said vehicle and a second suspension means for connecting the second axle to the frame members of said vehicle in such a manner that said wheels on said second axle may be selectively raised out of road engagement or lowered into road engagement, the improvement comprising as said second suspension means the lift axle suspension system of claim 10 and wherein said pair of longitudinal support members are connected to respective frame members of said vehicle.

* * * * *